(12) United States Patent
Endo et al.

(10) Patent No.: US 7,426,854 B2
(45) Date of Patent: Sep. 23, 2008

(54) ABNORMALITY DETERMINATION DEVICE AND ABNORMALITY DETERMINATION METHOD OF VEHICLE

(75) Inventors: Hiroatsu Endo, Nagoya (JP); Kazuo Kawaguchi, Kasugai (JP)

(73) Assignee: Toyota Jidhosa Kabushiki Kaisha, Toyota (JP)

( * ) Notice: Subject to any disclaimer, the term of this patent is extended or adjusted under 35 U.S.C. 154(b) by 61 days.

(21) Appl. No.: 11/653,401

(22) Filed: Jan. 16, 2007

(65) Prior Publication Data

US 2007/0186632 A1   Aug. 16, 2007

(30) Foreign Application Priority Data

Jan. 31, 2006 (JP) .............................. 2006-021830

(51) Int. Cl.
*G01M 13/02* (2006.01)
(52) U.S. Cl. .................................................. 73/115.02
(58) Field of Classification Search .............. 73/115.01, 73/115.02, 115.03, 118.01
See application file for complete search history.

(56) References Cited

U.S. PATENT DOCUMENTS

2005/0054473 A1* 3/2005 Burns et al. .................. 475/257

FOREIGN PATENT DOCUMENTS

JP          A 2001-50382          2/2001

* cited by examiner

*Primary Examiner*—Eric S McCall
(74) *Attorney, Agent, or Firm*—Oliff & Berridge, PLC

(57) ABSTRACT

An abnormality determination device and an abnormality determination method of a vehicle that includes a stepped type automatic transmission capable of forming a plurality of speed change steps are provided. The presence/absence of an abnormality of an element related to formation of a predetermined speed change step is determined in a state of the vehicle where the predetermined speed change step is formed. Information about the abnormality determined to be present is then stored. If the information about the abnormality is stored when the vehicle is to newly start to run, the predetermined speed change step where the abnormality stored occurred is established, and the presence/absence of the abnormality of the element related to the formation of the predetermined speed change step is re-determined.

10 Claims, 9 Drawing Sheets

FIG. 7

|  | SLB1 | SLB2 | B1 | B2 |
|---|---|---|---|---|
| LOW SPEED STEP L (FIRST SPEED) | ◯ | ◯ | ✕ | ◯ |
| HIGH SPEED STEP H (SECOND SPEED) | ✕ | ✕ | ◯ | ✕ |

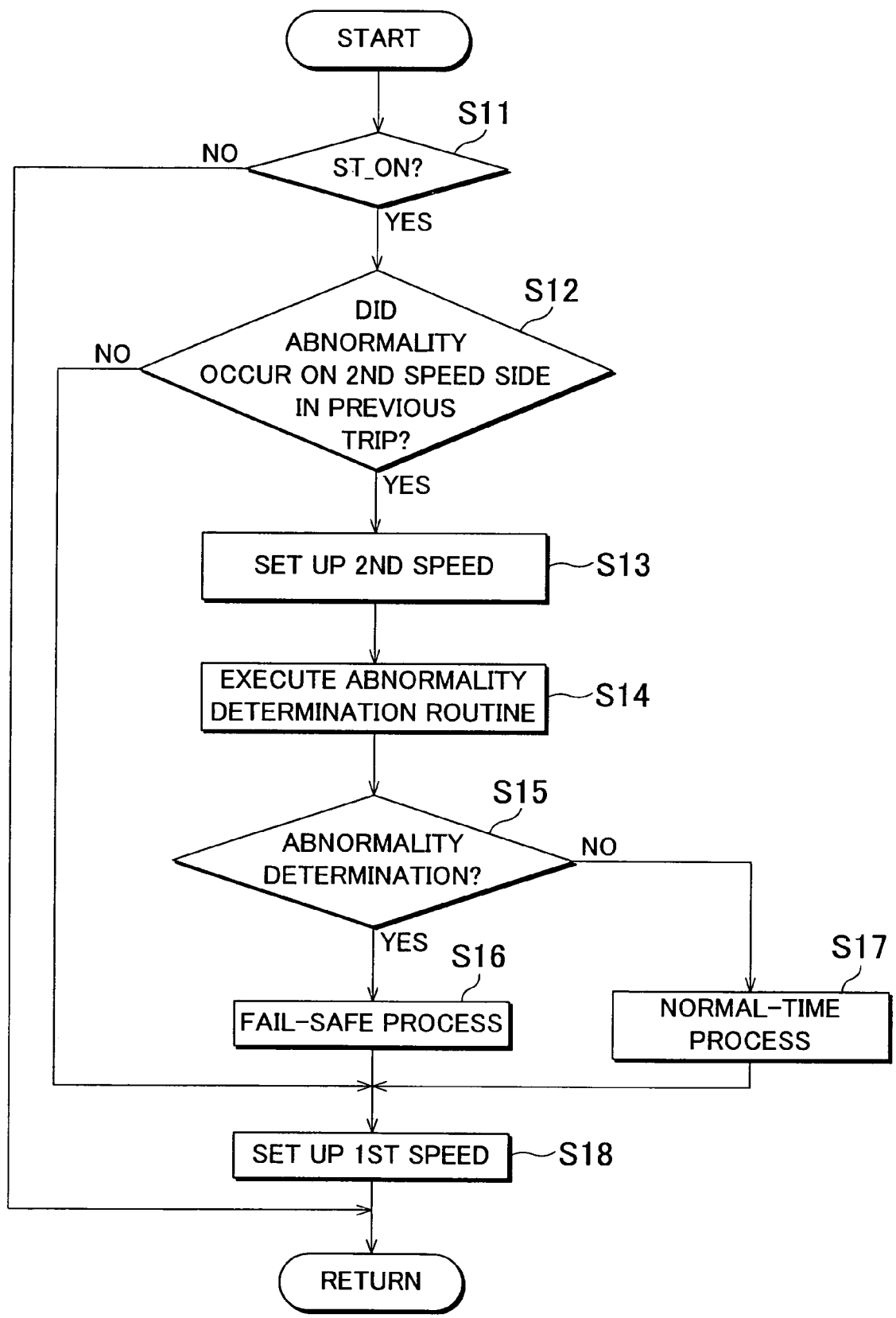

ABNORMALITY DETERMINATION DEVICE AND ABNORMALITY DETERMINATION METHOD OF VEHICLE

INCORPORATION BY REFERENCE

The disclosure of Japanese Patent Applications No. 2006-021830 filed on Jan. 31, 2006, including the specification, drawings and abstract is incorporated herein by reference in its entirety.

BACKGROUND OF THE INVENTION

1. Field of the Invention

The invention relates to an abnormality determination device and an abnormality determination method of a vehicle equipped with a stepped type automatic transmission. More particularly, the invention relates to a technology that performs abnormality determination regarding elements that are related to formation of a predetermined speed change step.

2. Description of the Related Art

In a vehicle equipped with a stepped type automatic transmission capable of forming a plurality of speed change steps, a known abnormality determination device determines whether or not the stepped type automatic transmission can normally form a speed change step.

For example, Japanese Patent Application Publication No. JP-A-2001-50382 describes a failure detection device in conjunction with a planetary gear type automatic transmission in which the switching among the speed change steps is performed by controlling the fastening (engagement) and release of a plurality of engagement devices. This failure detection device of the automatic transmission includes abnormality determination means for intentionally outputting a signal that causes the fastening of an engagement device that normally must not be fastened for a gear step, that is, an engagement device other than the engagement devices selected as a combination of devices to be fastened for the gear step, and for determining whether a fail-safe device that prevents interlock (simultaneous engagement) of the automatic transmission is reliably operating on the basis of whether or not pressure has been transmitted to the engagement device that normally must not be fastened.

Incidentally, in general, as for abnormalities due to valve sticking (valve fixation) of a fail-safe valve, a control valve, etc., or abnormalities of a detection switch that detects the pressure transmitted to engagement devices, etc., the abnormality determination needs to be performed in a state where a speed change step has actually been formed, or in a state where a command to form a speed change step has been output as shown in Japanese Patent Application Publication No. JP-A-2001-50382.

Then, in the case where there is an abnormality, such as the valve sticking or the like, which cannot be detected unless a speed change step has actually been formed, the shift to the speed change step having the abnormality may possibly be performed despite the abnormality thereof; thus, there is a possibility of deterioration of the drivability. Particularly, a high speed-side speed change step, which is less frequently used than a low speed-side speed change step, usually requires a relatively long time for the abnormality determination and the normality return determination, thus leading to a possibility of even greater deterioration of the drivability.

SUMMARY OF THE INVENTION

In light of the aforementioned problem, there are provided an abnormality determination device and an abnormality determination method of a vehicle equipped with a stepped type automatic transmission capable of forming a plurality of speed change step which both improve the drivability by appropriately determining the occurrence of an abnormality that cannot be detected unless a speed change step has actually been formed.

Accordingly, an abnormality determination device of a vehicle that includes a stepped type automatic transmission capable of forming a plurality of speed change steps is provided. This determination device includes the following devices:

an abnormality determiner that determines presence/absence of an abnormality of an element related to formation of a predetermined speed change step in a state of the vehicle where the predetermined speed change step is formed;

a storage device that stores information about the abnormality determined to be present by the abnormality determiner; and a controller that establishes, if the information about the abnormality is stored in the storage means when the vehicle is to newly start to run, the predetermined speed change step where the abnormality stored occurred, in order to cause re-determination of the presence/absence of the abnormality of the element related to the formation of the predetermined speed change step.

According to another aspect of the invention, an abnormality determination method of a vehicle that includes a stepped type automatic transmission capable of forming a plurality of speed change steps is provided. This determination method includes:

determining presence/absence of an abnormality of an element related to formation of a predetermined speed change step in a state of the vehicle where the predetermined speed change step is formed;

storing information about the abnormality determined to be present; and establishing, if the information about the abnormality is stored when the vehicle is to newly start to run, the predetermined speed change step where the abnormality stored occurred, and re-determining the presence/absence of the abnormality of the element related to the formation of the predetermined speed change step.

According to the abnormality determination device and the abnormality determination method of the vehicle described above, if the information about an abnormality of an element related to the formation of a predetermined speed change step which was determined to be present by the abnormality determiner is stored in the storage device when the vehicle is to newly start to run, the predetermined speed change step is established by the controller in order to cause re-determination of the presence/absence of the abnormality of the element related to the formation of the predetermined speed change step. Therefore, the occurrence of the abnormality that cannot be detected unless the predetermined speed change step has actually been established can be determined before the vehicle runs on the predetermined speed change step. Hence, for example, if the abnormality exists, the fail-safe operation of prohibiting the shift to the predetermined speed change step or the like can be performed. On the other hand, if normality has returned, the shift to the predetermined speed change step is allowed. Thus, the drivability can be improved.

In a suitable construction, the automatic transmission is constructed of any of various planetary gear type multi-step transmissions having speed change steps of, for example, forward four steps, forward five steps, forward six steps or more, in which one of a plurality of gear steps is selectively achieved as the rotating elements of a plurality of sets of planetary gear devices are selectively engaged, or a hybrid drive device has a configuration in which the automatic transmission includes a differential mechanism constructed of, for example, a planetary gear device, which distributes the motive power from an engine to a first electric motor and to an output shaft, and a second electric motor provided on the output shaft of the differential mechanism, and that mechanically transmits a major part of the motive power from the engine to the driving wheels and electrically transmits the remainder part of the motive power from the engine through the use of an electric path from the first electric motor to the second electric motor so that the speed change ratio is electrically altered, wherein the second electric motor is operatively linked to the output shaft via the above-described planetary gear type multi-step transmission, or the like.

Furthermore, in a suitable construction, the installed posture of the transmission relative to the vehicle may be a transversely mounted type in which the axis of the transmission is in the direction of width of the vehicle as in FF (front engine, front wheel drive) vehicles and the like, or a longitudinally mounted type in which the axis of the transmission is in the longitudinal direction of the vehicle as in FR (front engine, rear wheel drive) vehicles and the like.

In a suitable construction, as for the aforementioned friction engagement devices, hydraulic friction engagement devices that are engaged by hydraulic actuators, including a multi-plate type or single-plate clutches or brakes, belt-type brakes, etc., are widely used. The oil pump that supplies working oil for engaging the hydraulic type friction engagement devices may be, for example, a pump that is driven by a motive power source for running the vehicle to eject the working oil, or may also be a pump that is driven by a dedicated electric motor that is disposed separately from the vehicle-running motive power source. Besides, the clutches or brakes may also be electromagnetic engage devices, for example, electromagnetic clutches, magnetic particle clutches, etc., besides hydraulic type friction engagement devices.

Also, in a suitable construction, it is appropriate if the drive power source, such as the engine, that is, an internal combustion engine such as a gasoline engine, a diesel engine, etc., an electric motor, etc., and the automatic transmission are operatively interlinked. For example, a pulsation absorption damper (vibration damping device), a direct-couple clutch, a damper-equipped direct-couple clutch, a fluid transfer device, etc., may be disposed between therebetween. The drive power source and the input shaft of the automatic transmission may also be always linked. As for the fluid transfer device, a lockup clutch-equipped torque converter, a fluid coupling, etc., are widely used.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 1 is a diagram illustrating a hybrid drive device to which a first embodiment as an example of the invention is applied, and is also a block diagram illustrating portions of a control system that is provided in the vehicle for controlling the hybrid drive device and the like;

FIG. 7 is a table illustrating operations of a hydraulic control circuit;

FIG. 11 is the flowchart illustrating portions of the control operation of the electronic control devices shown in FIG. 1, that is, a control operation for abnormality determination regarding the high speed step which is one of system checks that is executed at the time of start of vehicle run.

DETAILED DESCRIPTION OF THE PREFERRED EMBODIMENTS

In the following description and the accompanying drawings, the present invention will be described in more detail with reference to exemplary embodiments.

Figure 1:
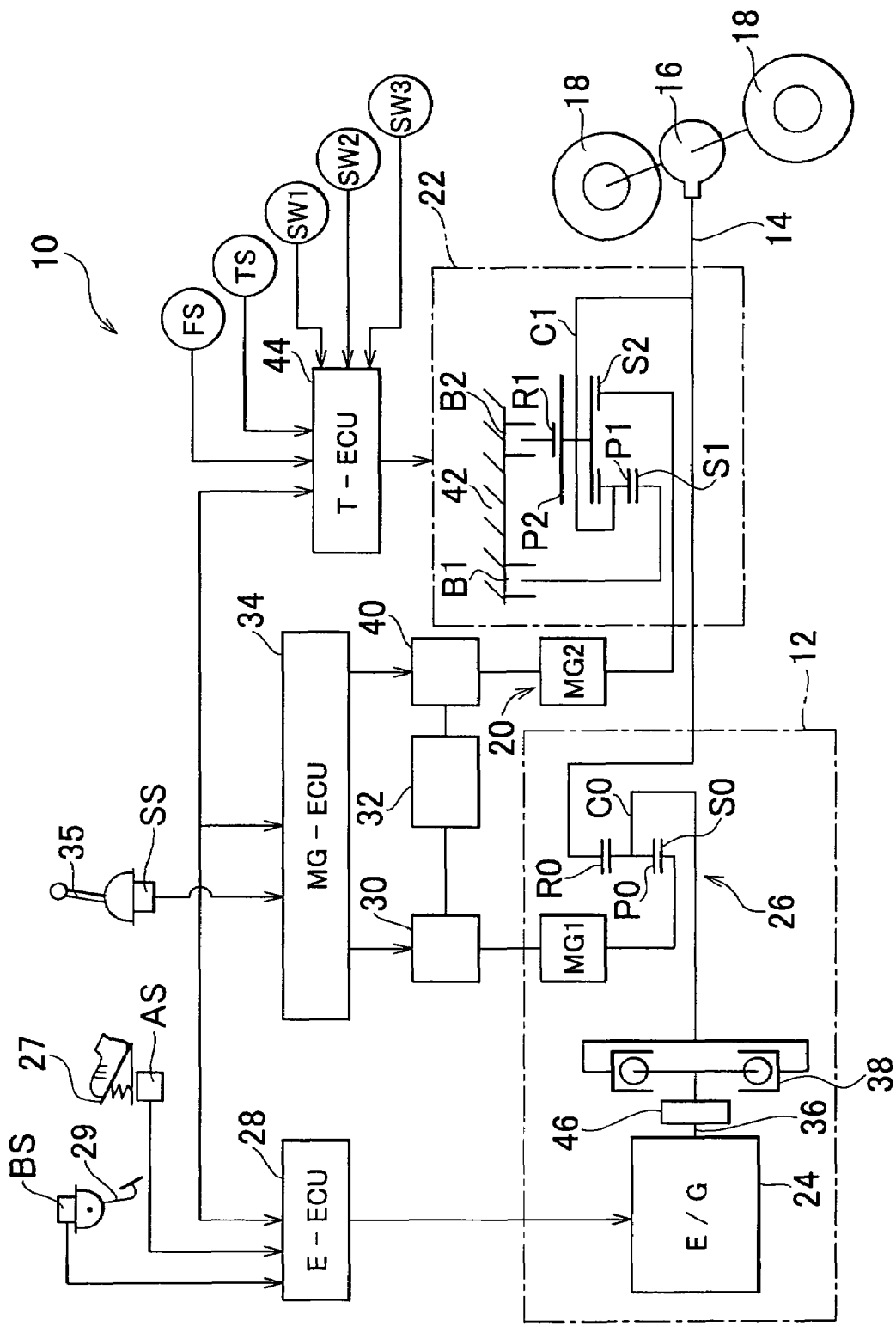

FIG. 1 is a diagram illustrating a hybrid drive device 10 to which a first embodiment as an example of the invention is applied. Referring to FIG. 1, in the hybrid drive device 10, torque of a first drive source 12 that is a main drive source is transmitted to an output shaft 14 that functions as an output member, and the torque is transmitted from the output shaft 14 to a pair of left and right driving wheels 18 via a differential gear device 16 in a vehicle. Besides, in the hybrid drive device 10, a second drive source 20 capable of selectively executing a power running control of outputting the drive power for running the vehicle or a regenerative control for recovering energy is provided. The second drive source 20 is linked to the output shaft 14 via a transmission 22. Therefore, the capacity of torque transmitted from the second drive source 20 to the output shaft 14 is increased or decreased in accordance with the speed change ratio γs (=the rotation speed of the MG2/the rotation speed of the output shaft 14) that is set by the transmission 22.

The transmission 22 is constructed so as to establish a plurality of steps whose speed change ratios γs is greater than or equal to "1". Therefore, at the time of power running when torque is output from the second drive source 20, the torque can be increased by the transmission 22 while being transmitted to the output shaft 14. Hence, the second drive source 20 is constructed with a further reduced capacity or in a further reduced size. Due to this, for example, in the case where the rotation speed of the output shaft 14 increases in association with high vehicle speed, the speed change ratio γs is dropped to drop the rotation speed of the second drive source 20, in order to maintain a good state of the operation efficiency of the second drive source 20. In the case where the rotation speed of the output shaft 14 drops, the speed change ratio γs is increased.

As for the shifting of the transmission 22, the torque capacity of the transmission 22 drops or inertial torque associated with change in the rotation speed occurs, in which case the torque of the output shaft 14, that is, the output shaft torque, is affected. Therefore, in the hybrid drive device 10, on the occasion of shifting by the transmission 22, a control is performed such that the torque of the first drive source 12 is corrected so as to prevent or restrain the torque fluctuation of the output shaft 14.

The first drive source 12 is constructed mainly of an engine 24, a MG1 (hereinafter, referred to as "MG1"), and a planetary gear device 26 provided for combining or distributing torque between the engine 24 and the MG1. The engine 24 is a publicly known internal combustion engine that outputs power by burning fuel, such as a gasoline engine, a diesel engine, etc. The engine 24 is constructed so that states of operation thereof, such as a the throttle opening degree, the intake air amount, the fuel supply amount, the ignition timing, etc., are electrically controlled by an engine-controlling electronic control device (E-ECU) 28 that is made up mainly of a microcomputer. The electronic control device 28 is supplied with detection signals from an accelerator operation amount sensor AS that detects the operation amount of an accelerator pedal 27, a brake sensor BS for detecting operation of a brake pedal 29, etc.

The MG1 is, for example, a synchronous electric motor, and is constructed to selectively perform the function as an electric motor of generating drive torque and the function as an electric power generator. The MG1 is connected to an electricity storage device 32, such as a battery, a capacitor, etc., via an inverter 30. Then, the inverter 30 is controlled by a motor-generator-controlling electronic control device (MG-ECU) 34 made up mainly of a microcomputer so that the output torque of the MG1 or the regenerative torque is adjusted or set. The electronic control device 34 is supplied with detection signals from an operation position sensor SS that detects the operation position of a shift lever 35, and the like.

The planetary gear device 26 is a single-pinion type planetary gear mechanism that includes three rotating elements: a sun gear S0, a ring gear R0 disposed concentrically with the sun gear S0, and a carrier C0 that supports pinions P0 meshing with the sun gear S0 and the ring gear R0, in such a manner that the pinions P0 are rotatable about their own axes and also revolvable. The planetary gear device 26 causes known differential effect. The planetary gear device 26 is provided concentrically with the engine 24 and the transmission 22. Since the planetary gear device 26 and the transmission 22 are constructed substantially symmetrically about a center line, the half portions thereof below the center line are omitted in FIG. 1.

In this embodiment, a crankshaft 36 of the engine 24 is linked to the carrier C0 of the planetary gear device 26 via a damper 38. The sun gear S0 is linked to the MG1, and the output shaft 14 is linked to the ring gear R0. The carrier C0 functions as an input element, and the sun gear S0 functions as a reaction force element, and the ring gear R0 functions as an output element.

Figure 2:
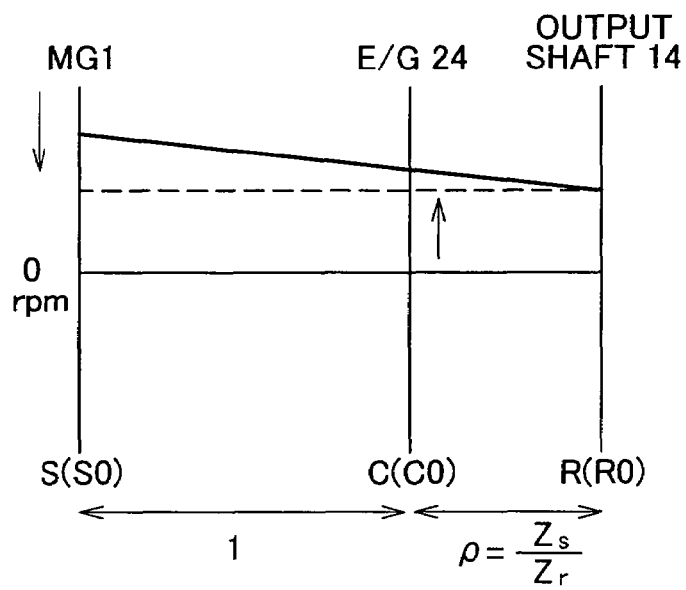
FIG. 2 is an alignment chart showing a relative relationship in rotation speed among the rotating elements of a single-pinion type planetary gear device that functions as a torque combining-distributing mechanism.

Relative relationships among the rotating elements of the single-pinion type planetary gear device 26 that functions as a torque combining-distributing mechanism are shown by an alignment chart in FIG. 2. In the alignment chart, a vertical axis S, a vertical axis C, and a vertical axis R represent the rotation speed of the sun gear S0, the rotation speed of the carrier C0, and the rotation speed of the ring gear R0, respectively. The intervals between the vertical axis S, the vertical axis C, and the vertical axis R are set so that when the interval between the vertical axis S and the vertical axis C is 1, the interval between the vertical axis C and the vertical axis R becomes ρ (the number of teeth Zs of the sun gear S0/the number of teeth Zr of the ring gear R0).

In the planetary gear device 26, when a reaction torque from the MG1 is input to the sun gear S0 while the output torque of engine 24 is input to the carrier C0, a torque greater than the torque input from the engine 24 appears on the ring gear R0 that is the output element, so that the MG1 functions as an electric power generator. While the rotation speed of the ring gear R0 (output shaft rotation speed) NO is constant, the rotation speed NE of the engine 24 can be continuously (steplessly) changed by changing the rotation speed of the MG1 upward or downward. The dashed line in FIG. 2 shows a state where the rotation speed NE of the engine 24 drops when the rotation speed of the MG1 is lowered from the value shown by a solid line. That is, a control of setting the rotation speed NE of the engine 24 at, for example, a rotation speed that provides the best fuel economy, can be executed by controlling the MG1. This type of hybrid system is termed mechanical distribution system or split type.

Referring back to FIG. 1, the transmission 22 of the embodiment is constructed of one set of a Ravigneaux type planetary gear mechanism. Specifically, in the transmission 22, a first sun gear S1 and a second sun gear S2 are provided, and short pinions P1 mesh with the first sun gear S1. The short pinions P1 also mesh with long pinions P2 whose axial length is longer than that of the short pinions P1. The long pinions P2 mesh with a ring gear R1 that is disposed concentrically with the sun gears S1, S2. The pinions P1, P2 are supported by a common carrier C1 so as to be rotatable about their own axes and also revolvable. Besides, the second sun gear S2 meshes with the long pinions P2.

The second drive source 20 is constructed of a second motor-generator (hereinafter, referred to as "MG2") that is an electric motor or an electric power generator that is controlled by the motor-generator-controlling electronic control device (MG-ECU) 34 via an inverter 40 so that the assist-purpose output torque or the regenerative torque is adjusted or set. The MG2 is linked to the second sun gear S2, and the carrier C1 is linked to the output shaft 14. The first sun gear S1 and the ring gear R1, together with the pinions P1, P2, construct a mechanism that corresponds to a double-pinion type planetary gear device. The second sun gear S2 and the ring gear R1, together with the long pinions P2, construct a mechanism that corresponds to a single-pinion type planetary gear device.

The transmission 22 is also provided with a first brake B1 that is provided between the first sun gear S1 and a transmission housing 42 for selectively fixing the first sun gear S1, and a second brake B2 that is provided between the ring gear R1 and the transmission housing 42 for selectively fixing the ring gear R1. These brakes B1, B2 are so-called friction engagement devices that produce braking force by friction force. As the brakes, it is possible to adopt multi-plate type engagement devices or band-type engagement devices. Then, each of the brakes B1, B2 is constructed so that the torque capacity thereof continuously changes in accordance with the engagement pressure that is generated by a hydraulic actuator or the like.

In the transmission 22 constructed as described above, when the second sun gear S2 functions as an input element and the carrier C1 functions as an output element and the first brake B1 is engaged, a high speed step H whose speed change ratio γsh is greater than "1" is achieved. If the second brake B2 is engaged instead of the first brake B1 in a similar situation, a low speed step L whose speed change ratio γsl is greater than the speed change ratio γsh of the high speed step H is set. The shifting between the speed change steps H and L is executed on the basis of states of run of the vehicle such as the vehicle speed, the required drive power (or the accelerator operation amount), etc. More concretely, speed change step regions are determined beforehand as a map (shift chart), and a control is performed such as to set either one of the speed change steps in accordance with the detected vehicle driving state. A shift-controlling electronic control device (T-ECU) 44 made up mainly of a microcomputer for performing the control is provided.

The electronic control device 44 is supplied with detection signals from an oil temperature sensor TS for detecting the temperature of the working oil, a hydraulic switch SW1 for detecting the engagement oil pressure of the first brake B1, a hydraulic switch SW2 for detecting the engagement oil pressure of the second brake B2, a hydraulic switch SW3 for detecting the line pressure PL, etc.

Figure 3:
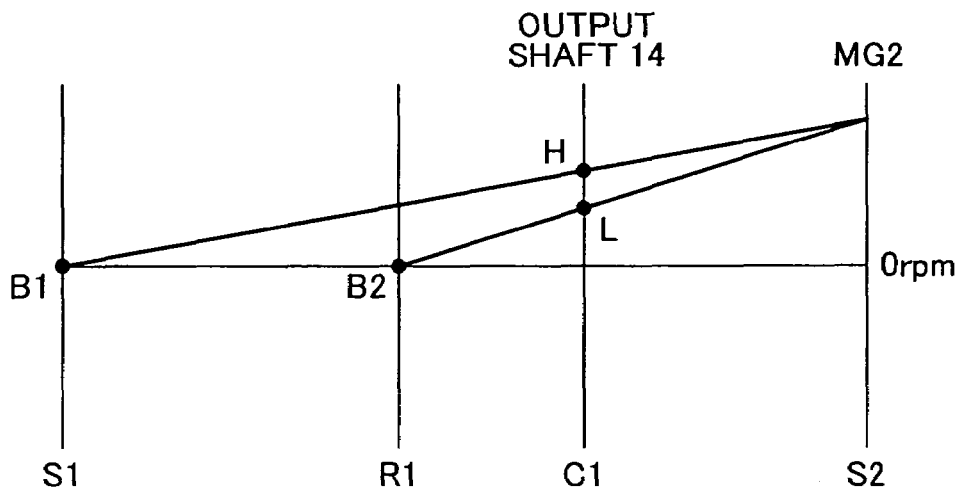
FIG. 3 is an alignment chart representing an interrelationship among the rotating elements of Ravigneaux type planetary gear mechanism that constitutes a transmission.

FIG. 3 shows an alignment chart that has four vertical axes, that is, a vertical axis S1, a vertical axis R1, a vertical axis C1, and a vertical axis S2, in order to represent relative relationships between the rotating elements of the Ravigneaux type planetary gear mechanism that constitutes the transmission 22. The vertical axis S1, the vertical axis R1, the vertical axis C1, and the vertical axis S2 show the rotation speed of the first sun gear S1, the rotation speed of the ring gear R1, the rotation speed of the carrier C1, and the rotation speed of the second sun gear S2, respectively.

In the transmission 22 constructed as described above, when the ring gear R1 is fixed by the second brake B2, the low speed step L is set, and the assist torque that the MG2 outputs is amplified in accordance with the corresponding speed change ratio γsl, and is thus applied to the output shaft 14. On the other hand, when the first sun gear S1 is fixed by the first brake B1, the high speed step H having the speed change ratio γsh that is smaller than the speed change ratio γhl of the low speed step L is set. Since the speed change ratio of the high speed step H is also larger than "1", the assist torque that the MG2 outputs is amplified in accordance with the speed change ratio γsh, and is applied to the output shaft 14.

Incidentally, although the torque applied to the output shaft 14 during a state where one of the speed change steps L, H is steadily set is a torque obtained by increasing the output torque of the MG2 in accordance with the corresponding speed change ratio, the torque during a shift transitional state of the transmission 22 is a torque that is affected by the torque capacity at the brake B1 or B2, the inertia torque associated with the rotation speed change, etc. Besides, the torque applied to the output shaft 14 becomes positive torque during a driving state of the MG2, and becomes negative torque during a driven state of the MG2.

Figure 4:
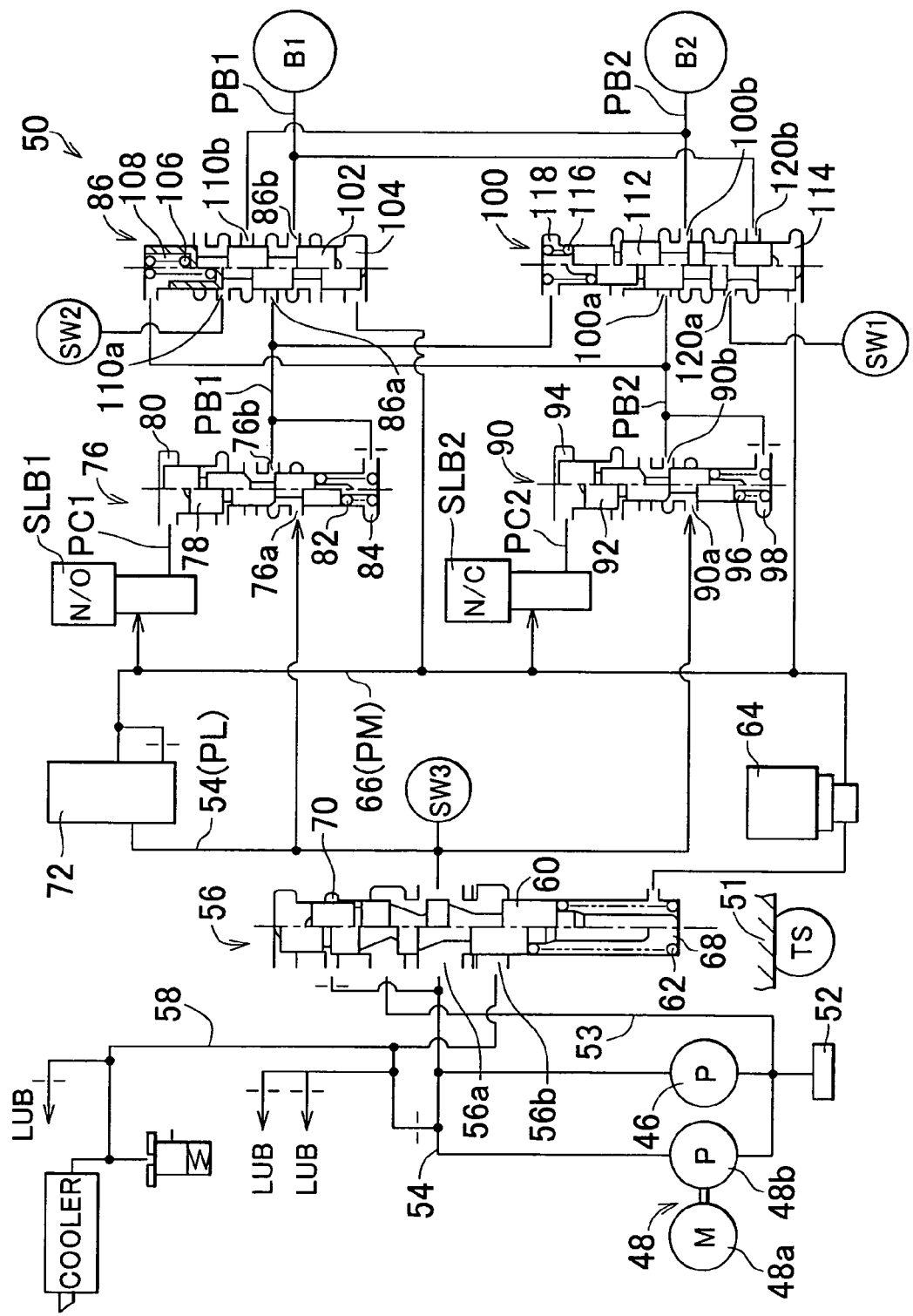
FIG. 4 shows a shift-purpose hydraulic control circuit for automatically controlling the shift of the transmission by engaging and releasing a first brake and a second brake.

FIG. 4 shows a shift-purpose hydraulic control circuit 50 for automatically controlling the shifting of the transmission 22 by engaging and releasing the brakes B1, B2. The hydraulic control circuit 50 includes, as oil pressure sources, a mechanical type hydraulic pump 46 that is operatively linked to the crankshaft 36 of the engine 24 and therefore is rotationally driven by the engine 24, and an electric type hydraulic pump 48 that includes an electric motor 48a and a pump 48b that is rotationally driven by the electric motor 48a. The mechanical type hydraulic pump 46 and the electric type hydraulic pump 48 suck the working oil that is refluxed to an oil pan (not shown), via a strainer 52, or suck the working oil that is directly refluxed via a reflux oil passageway 53, and pumps the working oil to a line pressure oil passageway 54. An oil temperature sensor TS for detecting the oil temperature of the refluxed working oil is provided on a valve body 51 that partially forms the hydraulic control circuit 50, but may also be connected to a different site.

A line pressure regulating valve 56 is a relief-type pressure regulating valve, and includes a spool valve element 60 that opens and closes between a supply port 56a connected to the line pressure oil passageway 54 and a discharge port 56b connected to a drain oil passageway 58, a control oil chamber 68 which houses a spring 62 that generates thrust in the closing direction of the spool valve element 60 and which receives a module pressure PM from a module pressure oil passageway 66 via an electromagnetic open-close valve 64 when the set pressure of the line pressure PL is altered to a higher level, and a feedback oil chamber 70 connected to the line pressure oil passageway 54 which generates thrust in the opening direction of the spool valve element 60. The line pressure regulating valve 56 outputs a constant line pressure PL that is one of a low pressure and a high pressure. The line pressure oil passageway 54 is provided with a hydraulic switch SW3 that is in an off-state when the line pressure PL is at the high pressure-side value, and that is in an on-state when the line pressure PL is at the low pressure-side value or lower. Since the operation of the hydraulic switch SW3 is switched depending of the high or low level of the line pressure PL, it is possible to determine the presence/absence of an abnormality of the line pressure regulating valve 56 as well as the presence/absence of an abnormality of the line pressure PL.

A module pressure regulating valve 72 outputs to the module pressure oil passageway 66 a constant module pressure PM that is set lower than the low pressure-side line pressure PL, using the line pressure PL as a basic pressure, regardless of fluctuations of the line pressure PL. A first linear solenoid valve SLB1 for controlling the first brake B1 and a second linear solenoid valve SLB2 for controlling the second brake B2, using the module pressure PM as a basic pressure, output control pressures PC1 and PC2 in accordance with drive currents ISOL1 and ISOL2 that are command values from the electronic control device 44.

Figure 5:
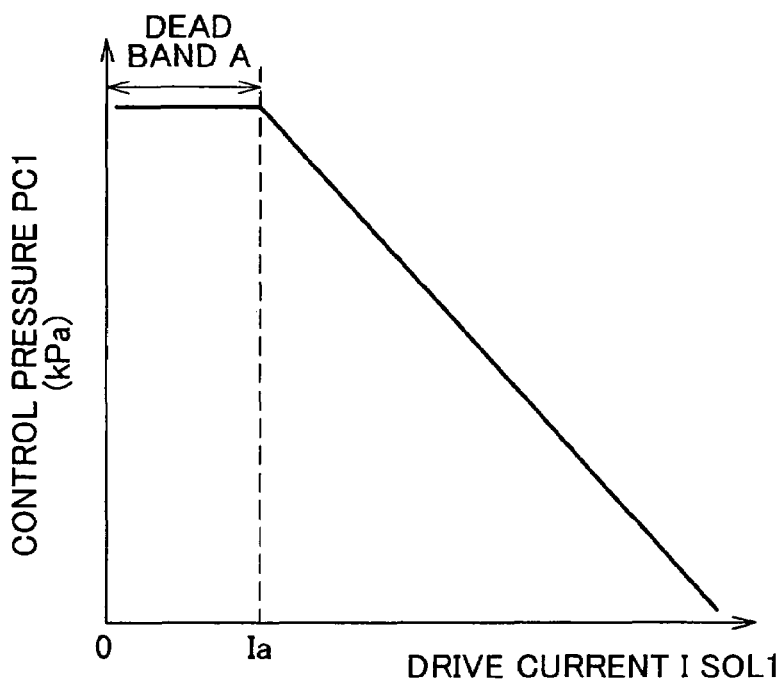
FIG. 5 is a diagram showing a valve characteristic of a normally closed type first linear solenoid valve that establishes an open valve (communicated) state between the input port and the output port during a non-electrified state.
Figure 6:
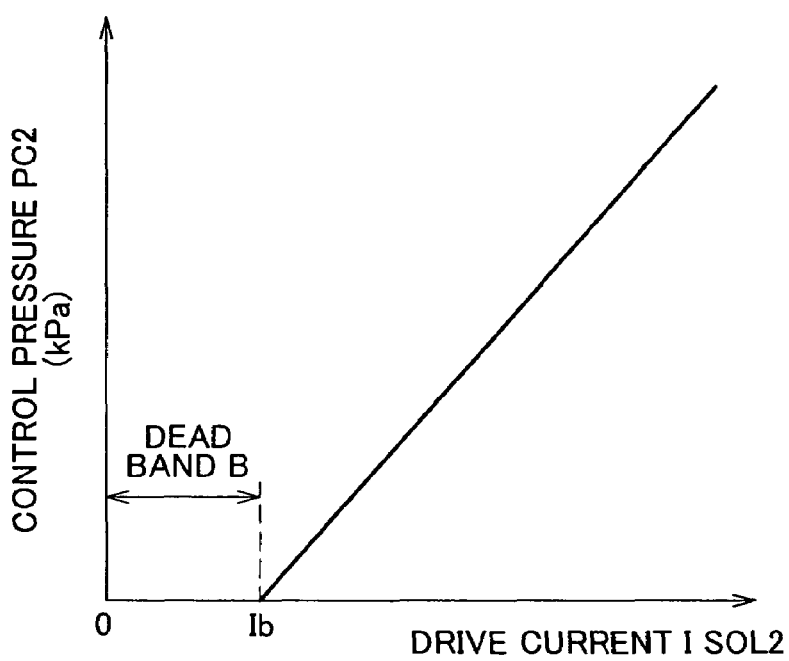
FIG. 6 is a diagram showing a valve characteristic of a normally open type second linear solenoid valve that establishes a closed valve (shut-off) state between the input port and the output port during a non-electrified state.

The first linear solenoid valve SLB1 has a normally open type valve characteristic of establishing an open valve (communicated) state between the input port and the output port during the non-electrified state. As shown in FIG. 5, as the drive current ISOL1 increases, the output control pressure PC1 is dropped. As shown in FIG. 5, the valve characteristic of the first linear solenoid valve SLB1 is provided with a dead band A in which the output control pressure PC1 does not drop until the drive current ISOL1 exceeds a predetermined value Ia. The second linear solenoid valve SLB2 has a normally closed type valve characteristic of establishing a closed (shut-off) state between the input port and the output port during the non-electrified state. As shown in FIG. 6, as the drive current ISOL2 increases, the output control pressure PC2 is increased. As shown in FIG. 6, the valve characteristic of the second linear solenoid valve SLB2 is provided with a dead band B in which the output control pressure PC2 does not increase until the drive current ISOL2 exceeds a predetermined value Ib.

A B1 control valve 76 includes a spool valve element 78 that opens and closes between an input port 76a connected to the line pressure oil passageway 54 and an output port 76b that outputs a B1 engagement oil pressure PB1, a control oil chamber 80 that receives the control pressure PC1 from the first linear solenoid valve SLB1 in order to urge the spool valve element 78 in the opening direction, and a feedback oil chamber 84 which houses a spring 82 that urges the spool valve element 78 in the closing direction and which receives the B1 engagement oil pressure PB1 that is the output pressure. The B1 control valve 76, using the line pressure PL in the line pressure oil passageway 54 as a basic pressure, outputs the B1 engagement oil pressure PB1 whose magnitude is in accordance with the control pressure PC1 from the first linear solenoid valve SLB1, and supplies it to the brake B1 through a B1 apply control valve 86 that functions as an interlock valve.

A B2 control valve 90 includes a spool valve element 92 that opens and closes between an input port 90a connected to the line pressure oil passageway 54 and an output port 90b that outputs a B2 engagement oil pressure PB2, a control oil chamber 94 that receives the control pressure PC2 from the second linear solenoid valve SLB2 in order to urge the spool valve element 92 in the opening direction, and a feedback oil chamber 98 which houses a spring 96 that urges the spool valve element 92 in the closing direction and which receives the B2 engagement oil pressure PB2 that is the output pressure. The B2 control valve 90, using the line pressure PL in the line pressure oil passageway 54 as a basic pressure, outputs the B2 engagement oil pressure PB2 whose magnitude is in accordance with the control pressure PC2 from the second linear solenoid valve SLB2, and supplies it to the brake B2 through a B2 apply control valve 100 that functions as an interlock valve.

The B1 apply control valve 86 includes a spool valve element 102 which opens and closes an input port 86a that receives the B1 engagement oil pressure PB1 output from the B1 control valve 76 and an output port 86b connected to the first brake B1, an oil chamber 104 that receives the module pressure PM in order to urge the spool valve element 102 in the opening direction, and an oil chamber 108 which houses a spring 106 that urges the spool valve element 102 in the closing direction and which receives the B2 engagement oil pressure PB2 output from the B2 control valve 90. The B1 apply control valve 86 is held in the open valve state until it is supplied with the B2 engagement oil pressure PB2 for engaging the second brake B2. When the B2 engagement oil pressure PB2 is supplied, the B1 apply control valve 86 is switched to the closed valve state, so that the engagement of the first brake B1 is prevented.

The B1 apply control valve 86 is provided with a pair of ports 110a and 110b that are closed when the spool valve element 102 is in the open valve position (position as indicated on the right side of a center line shown in FIG. 4), and that are opened when the spool valve element 102 is in the valve closed position (position as indicated on the left side of the center line shown in FIG. 4). The hydraulic switch SW2 for detecting the B2 engagement oil pressure PB2 is connected to the port 110a, and the second brake B2 is directly connected to the other port 110b. The hydraulic switch SW2 assumes an on-state when the B2 engagement oil pressure PB2 becomes a high-pressure state that is set beforehand, and is switched to an off-state when the B2 engagement oil pressure PB2 reaches or goes below a low-pressure state that is set beforehand. Since the hydraulic switch SW2 is connected to the second brake B2 via the B1 apply control valve 86, it is possible to determine the presence/absence of an abnormality of the first linear solenoid valve SLB1, the B1 control valve 76, the B1 apply control valve 86, etc., that constitute the hydraulic system of the first brake B1, as well as the presence/absence of an abnormality of the B2 engagement oil pressure PB2.

The B2 apply control valve 100, similar to the B1 apply control valve 86, includes a spool valve element 112 that opens and closes between an input port 100a that receives the B2 engagement oil pressure PB2 output from the B2 control valve 90 and an output port 100b connected to the second brake B2, an oil chamber 114 that receives the module pressure PM in order to urge the spool valve element 112 in the opening direction, and an oil chamber 118 which houses a spring 116 that urges the spool valve element 112 in the closing direction and which receives the B1 engagement oil pressure PB1 output from the B1 control valve 76. The B2 apply control valve 100 is held in the open valve state until it is supplied with the B1 engagement oil pressure PB1 for engaging the first brake B1. When the B1 engagement oil pressure PB1 is supplied, the B2 apply control valve 100 is switched to the closed valve state, so that the engagement of the second brake B2 is prevented.

The B2 apply control valve 100 is also provided with a pair of parts 120a and 120b that are closed when the spool valve element 112 is in the open valve position (position as indicated on the right side of a center line shown in FIG. 4), and that are opened when the spool valve element 112 is in the valve closed position (position as indicated on the left side of the center line shown in FIG. 4). The hydraulic switch SW1 for detecting the B1 engagement oil pressure PB1 is connected to the port 120a, and the first brake B1 is directly connected to the other port 120b. The hydraulic switch SW1 assumes an on-state when the B1 engagement oil pressure PB1 becomes a high-pressure state that is set beforehand, and is switched to an off-state when the B1 engagement oil pressure PB1 reaches or goes below a low-pressure state that is set beforehand. Since the hydraulic switch SW1 is connected to the first brake B1 via the B2 apply control valve 100, it is possible to determine the presence/absence of an abnormality of the second linear solenoid valve SLB2, the B2 control valve 90, the B2 apply control valve 100, etc., that constitute the hydraulic system of the second brake B2, as well as the presence/absence of an abnormality of the B1 engagement oil pressure PB1.

FIG. 7 is a table illustrating operations of the hydraulic control circuit 50 constructed as described above. In FIG. 7, symbol "○" shows the excited state or the engaged state, and symbol "x" shows the non-excited state or the released state. That is, by putting both the first linear solenoid valve SLB1 and the second linear solenoid valve SLB2 into the excited state, the first brake B1 is put into the released state and the second brake B2 is put into the engaged state, so that the low speed step L (i.e., the first speed gear step) of the transmission 22 is achieved. By putting both the first linear solenoid valve SLB1 and the second linear solenoid valve SLB2 into the non-excited state, the first brake B1 is put into the engaged state and the second brake B2 is put into the released state, so that the high speed step H (i.e., the second speed gear step) of the transmission 22 is achieved.

Figure 8:
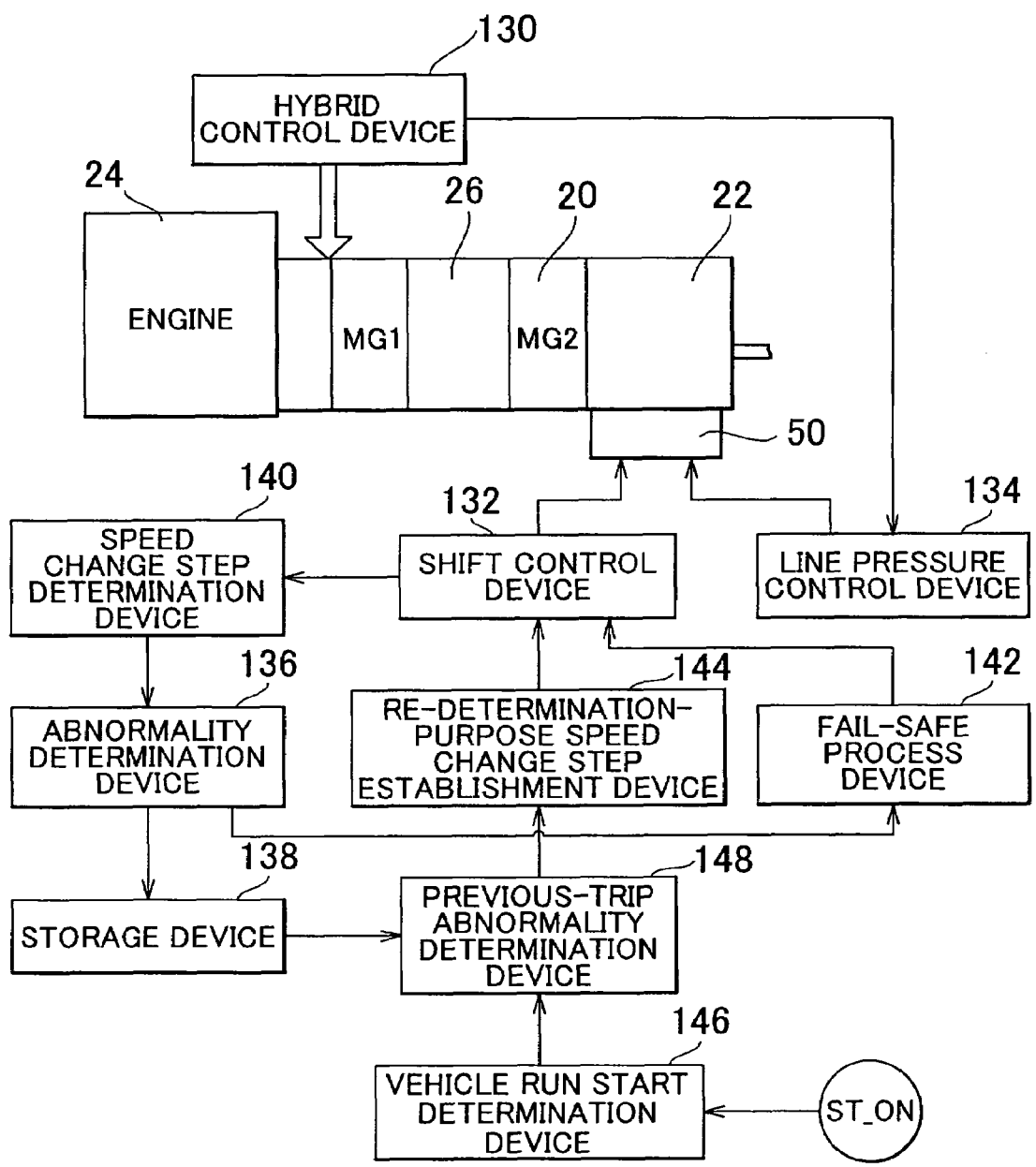
FIG. 8 is a functional block diagram illustrating portions of control functions of electronic control devices shown in FIG. 1.

FIG. 8 is a functional block diagram illustrating portions of control functions of the electronic control devices 28, 34 and 44. In FIG. 8, for example, when the control is activated as the power switch is operated during a state where the brake pedal is operated after the key has been inserted into the key slot, a hybrid drive control device 130 calculates a driver's requested output on the basis of the accelerator operation amount, and causes the engine 24 and/or the MG2 to generate the requested output so as to bring about an operation with good fuel economy and low emission gas amount. For example, the run mode is switched in accordance with the state of run of the vehicle, among a motor run mode in which the engine 24 is stopped and the MG2 is solely used as drive source, a run mode in which the vehicle is run by using the MG2 as a drive source while electric power is generated from the motive power of the engine 24, and an engine run mode in which the vehicle is run by mechanically transmitting the motive power of the engine 24 to the driving wheels 18.

The hybrid drive control device 130 controls the rotation speed of the engine 24 via the MG1 so that the engine 24 operates on an optimal fuel economy curve, even when the engine 24 is driven. Besides, in the case where the MG2 is driven to perform the torque assist, the hybrid control device 130 sets the transmission 22 to the low speed step L to increase the torque applied to the output shaft 14 during a state of low vehicle speed. During a state of increased vehicle speed, the hybrid control device 130 sets the transmission 22 to the high speed step H to relatively drop the rotation speed of the MG2 and therefore reduce the loss. Thus, the torque assist with good efficiency is executed. Furthermore, during the coasting run, the inertia energy that the vehicle has is used to rotationally drive the MG1 or the MG2, so that the energy is regenerated as electric power that is in turn stored into the electricity storage device 32.

Figure 9:
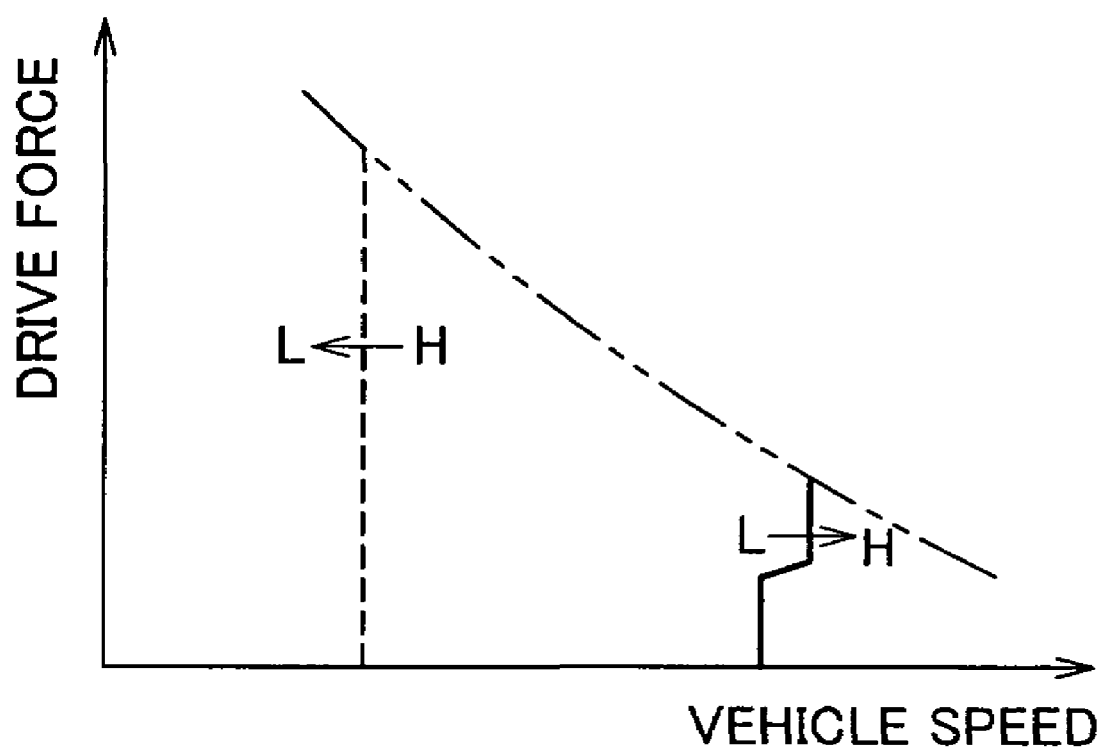
FIG. 9 is a shift chart that is used in a shift control of the transmission performed by the electronic control devices shown in FIG. 1.

A shift control device 132 determines a speed change step of the transmission 22 on the basis of the speed V and the drive power P of the vehicle from a pre-stored shift chart, for example, as shown in FIG. 9, and outputs the drive currents ISOL1 and ISOL2, i.e., the command values, to the hydraulic control circuit 50 to control the engagement and release of the first brake B1 and the second brake B2 so that the switch to the determined speed change step is automatically performed.

In the case where the calculated driver's requested output is greater than a pre-set output criterion value, or in the case where the transmission 22 is performing a shift, that is, is in a shift transition state, or the like, a line pressure control device 134 switches the set pressure of the line pressure PL from a low pressure state to a high pressure state by switching the electromagnetic open-close valve 64 from the closed state to the open state to supply the module pressure PM into the oil chamber 68 of the line pressure regulating valve 56 and to therefore increase the thrust on the spool valve element 60 in the closing direction by a predetermined value.

In the state of the vehicle in which either one of the speed change steps L, H is formed, an abnormality determination device 136 determines the presence/absence of an abnormality of elements related to the formation of that speed change step L, H on the basis of, for example, a predetermined rule.

The elements related to the formation of the speed change steps L, H include the line pressure regulating valve 56 that regulates the line pressure PL that serves as the basic pressure of, for example, the B1 engagement oil pressure PB1, the B2 engagement oil pressure PB2, etc., the first linear solenoid valve SLB1, the B1 control valve 76, the B1 apply control valve 86, etc. that constitute the hydraulic system of the first brake B1, the second linear solenoid valve SLB2, the B2 control valve 90, the B2 apply control valve 100, etc. that constitute the hydraulic system of the second brake B2, the hydraulic switch SW1 for detecting the B1 engagement oil pressure PB1, the hydraulic switch SW2 for detecting the B2 engagement oil pressure PB2, the hydraulic switch SW3 for detecting the line pressure PL, etc. As for the abnormality of these elements, the valve sticking or the like is assumed with regard to the aforementioned valves. With regard to the hydraulic switches SW1, SW2, SW3, the abnormality in the switching operation between the on-state and the off-state thereof or the like is assumed. With regard to the linear solenoid valves SLB1, SLB2, such abnormalities as a break, shortcircuit, etc. are assumed.

Thus, the presence/absence of an abnormality of the aforementioned individual valves can be determined by detecting the states of operation of the hydraulic switches SW1, SW2, SW3, and the presence/absence of an abnormality of the individual switches SW1, SW2, SW3 themselves can also be determined. For example, in the case where the speed change step is switched to the low speed step L, the normal state includes the off-state of the switch SW1 corresponding to the pre-set low pressure state of the B1 engagement oil pressure PB1 or a state below the pre-set low pressure state, the on-state of the switch SW2 corresponding to the pre-set high pressure state of the B2 engagement oil pressure PB2, and the on-state of the switch SW3 that detects the high pressure state, that is, the set pressure of the line pressure PL for the shift transition time. Besides, when the speed change step is switched to the high speed step H, the normal state includes the on-state of the switch SW1 corresponding to the pre-set high pressure state of the B1 engagement oil pressure PB1, the off-state of the switch SW2 corresponding to the pre-set low pressure state of the B2 engagement oil pressure PB2 or a state below the pre-set low pressure state, and the on-state of the switch SW3 that detects the high pressure state, that is, the set pressure of the line pressure PL for the shift transition time.

The abnormality determination device 136, for example, when the low speed step L has been established, determines whether or not the switch SW1 is in the off-state, and whether or not the switch SW2 is in the on-state, and whether or not the switch SW3 is in the on-state, on the basis of a rule determined beforehand. If it is determined that the switch SW1 is in the off-state, and the switch SW2 is in the on-state, and the switch SW3 is in the on-state, the abnormality determination device 136 sets up a low-speed step normality determination flag FLG as a low-speed step determination flag FL. On the other hand, if the abnormality determination device 136 makes any one of the following: a determination that the switch SW1 is in the on-state; a determination that the switch SW2 is in the off-state; and a determination that the switch SW3 is in the off-state, the abnormality determination device 136 sets up a low-speed step abnormality determination flag FLE as a low-speed step determination flag FL.

For example, when the high speed step H has been established, the abnormality determination device 136 determines whether or not the switch SW1 is in the on-state, and whether or not the switch SW2 is in the off-state, and whether or not the switch SW3 is in the on-state, on the basis of a rule determined beforehand. If it is determined that the switch SW1 is in the on-state, and the switch SW2 is in the off-state, and the switch SW3 is in the on-state, the abnormality determination device 136 sets up a high-speed step normality determination flag FHG as a high-speed step determination flag FH. On the other hand, if the abnormality determination device 136 makes any one of the following: a determination that the switch SW1 is in the off-state; a determination that the switch SW2 is in the on-state; and a determination that the switch SW3 is in the off-state, the abnormality determination device 136 sets up a high-speed step abnormality determination flag FHE as the high-speed step determination flag FH.

A storage device 138 stores information about the abnormality determined to be present by the abnormality determination device 136. For example, the storage device 138 stores the low-speed step determination flag FL and the high-speed step determination flag FH while serially rewriting them to the determination flags F that are set up by the abnormality determination device 136.

A speed change step determination device 140 determines whether or not the shift of the transmission 22 to the high speed step H has been performed, for example, on the basis of whether or not the command values of the drive currents ISOL1 and ISOL2 for obtaining the high speed step H via the shift control device 132 have been output to the hydraulic control circuit 50. Also, the speed change step determination device 140 determines whether or not the shift of the transmission 22 to the low speed step L has been performed, for example, on the basis of whether or not the commands of the drive currents ISOL1 and ISOL2 for obtaining the low speed step L via the shift control device 132 have been output to the hydraulic control circuit 50.

The fail-safe process device 142 performs the abnormality determination on the basis of the determination flag F set up by the abnormality determination device 136, and accordingly executes a fail-safe process.

For example, the fail-safe process device 142 determines the low-speed step determination flag FL that has been set up by the abnormality determination device 136. Then, if the low-speed step abnormality determination flag FLE has been set up as the low-speed step determination flag FL, the fail-safe process device 142 outputs to the shift control device 132 a command to prohibit the shift to the low speed step L as a fail-safe process. On the other hand, if the low-speed step normality determination flag FLG has been set up as the low-speed step determination flag FL, the fail-safe process device 142 does not output to the shift control device 132 the command to prohibit the shift to the low speed step L as a normal-time process.

Also, the fail-safe process device 142 determines the high-speed step determination flag FH that has been set up by the abnormality determination device 136. Then, if the high-speed step abnormality determination flag FHE has been set up as the high-speed step determination flag FH, the fail-safe process device 142 outputs to the shift control device 132 a command to prohibit the shift to the high speed step H as a fail-safe process. On the other hand, if the high-speed step normality determination flag FHG has been set up as the high-speed step determination flag FH, the fail-safe process device 142 does not output to the shift control device 132 the command to prohibit the shift to the high speed step H, as a normal-time process.

Thus, the determination as to the abnormality regarding the formation of each of the speed change steps L, H is carried out by actual performance of the shift to the speed change step, and if the abnormality determination is made, the fail-safe operation is then executed. From another viewpoint, the abnormalities of valves, such as the B1 apply control valve 86 and the like, cannot be detected without actual formation of any speed change step. Therefore, in order for the fail-safe operation to be executed at the time of abnormality determination, there is a need to perform the shift to each speed change step L, H and perform the abnormality determination. Therefore, even if an abnormality has occurred regarding a speed change step, the shift to that speed change step may be performed once, and there is possibility of deterioration of the drivability. Particularly, the high speed step H, which is less frequently used than the low speed step L, usually requires a relatively long time for the abnormality determination and the normality return determination, and there is a possibility of even greater deterioration of the drivability.

Hence, in order that the occurrence of an abnormality that cannot be detected unless a speed change step has actually been formed will be determined before the vehicle runs on that speed change step, a re-determination-purpose speed change step establishment device 144, if information about an abnormality is stored in the storage device 138 when the vehicle is to newly start to run, establishes the speed change step where the abnormality stored in the storage device 138 occurred, in order to cause the abnormality determination device 136 to re-determine the presence/absence of an abnormality of an element related to the formation of the speed change step. Due to this, for example, in the case where the abnormality is determined to be present, a fail-safe operation of, for example, prohibiting the shift to that speed change step, can be performed before the vehicle runs on the speed change step. On the other hand, in the case where the abnormality is not determined to be present but normality has returned, the shift to that speed change step can be performed. Thus, the drivability can be improved.

Hereinafter, the control operation of the re-determination-purpose speed change step establishment device 144 will be concretely described. Incidentally, the following description will be made in conjunction with the case of the high speed step H where there particularly is a possibility of deterioration of the drivability, as for example, and the description in conjunction with the case of the low speed step L will be omitted. Of course, what will be described below applies to the low speed step L as well.

A vehicle run start determination device 146 determines whether or not a new vehicle run starting operation has been performed, that is, whether or not a user's operation for starting to run the vehicle has been performed, for example, on the basis of whether or not a power switch ST_ON has been operated during a state where the brake pedal is operated after the on-operation with the key inserted in a key slot has been performed. It is to be noted herein that the vehicle run starting operation includes the activating operation of the control device, and the starting of a system check of a control device or the like for obtaining a ready-to-run state READY-ON (e.g., the abnormality determination by the abnormality determination device 136), and does not mean the launch of the vehicle from the stopped state, as in the case of a signal stop or the like. However, by subsequently operating the shift lever 35 to a run position and operating the accelerator, a new vehicle run, that is, a new trip, is started. This trip is ended by, for example, the off-operation of the key, the re-depression of the power switch ST_ON, etc.

If it is determined by the vehicle run start determination device 146 that the user's operation for starting to run the vehicle has been performed, the previous-trip abnormality determination device 148 determines whether or not the information about the abnormality of the high speed step (second gear step) H determined to be present by the abnormality determination device 136 is stored, that is, whether or not the abnormality of the high speed step H occurred during the previous trip, that is, during the run preceding the present new start of vehicle run, on the basis of whether or not the high-speed step abnormality determination flag FHE is stored as the high-speed step determination flag FH in the storage device 138.

At the time of a new start of vehicle run where it is determined by the vehicle run start determination device 146 that the user's operation for starting to run the vehicle has been performed, if it is determined by the previous-trip abnormality determination device 148 that the information about the abnormality of the high speed step (second gear step) H is stored, the re-determination-purpose speed change step establishment device 144 causes the shift control device 132 to establish the high speed step H in order to cause the abnormality determination device 136 to perform re-determine the presence/absence of the abnormality of an element related to the formation of the high speed step H.

The fail-safe process device 142, in addition to the foregoing function, performs the abnormality determination on the basis of the high-speed step determination flag FH that has been set up again and thus updated by the abnormality determination device 136, and accordingly executes the fail-safe process.

The shift control device 132, in addition to the foregoing function, performs an operation for putting the vehicle into a ready-to-run state by setting up the low speed step L after the fail-safe process is performed by the fail-safe process device 142. Besides, even in the case where, at the time of a new start of vehicle run, it is determined by the previous-trip abnormality determination device 148 that the information about the abnormality of the high speed step H is not stored, the shift control device 132 performs an operation for putting the vehicle into the ready-to-run state by setting up the low speed step L.

In this manner, the re-determination-purpose speed change step establishment device 144, in response to the activating operation of the vehicle and prior to the setting of the ready-to-run state, forms the high speed step H and causes the re-determination of the presence/absence of an abnormality of an element related to the formation of the high speed step H.

In this embodiment, the abnormality determination device 136, the storage device 138, the re-determination-purpose speed change step establishment device 144, the previous-trip abnormality determination device 148, etc., correspond to an abnormality determination device.

Figure 10:
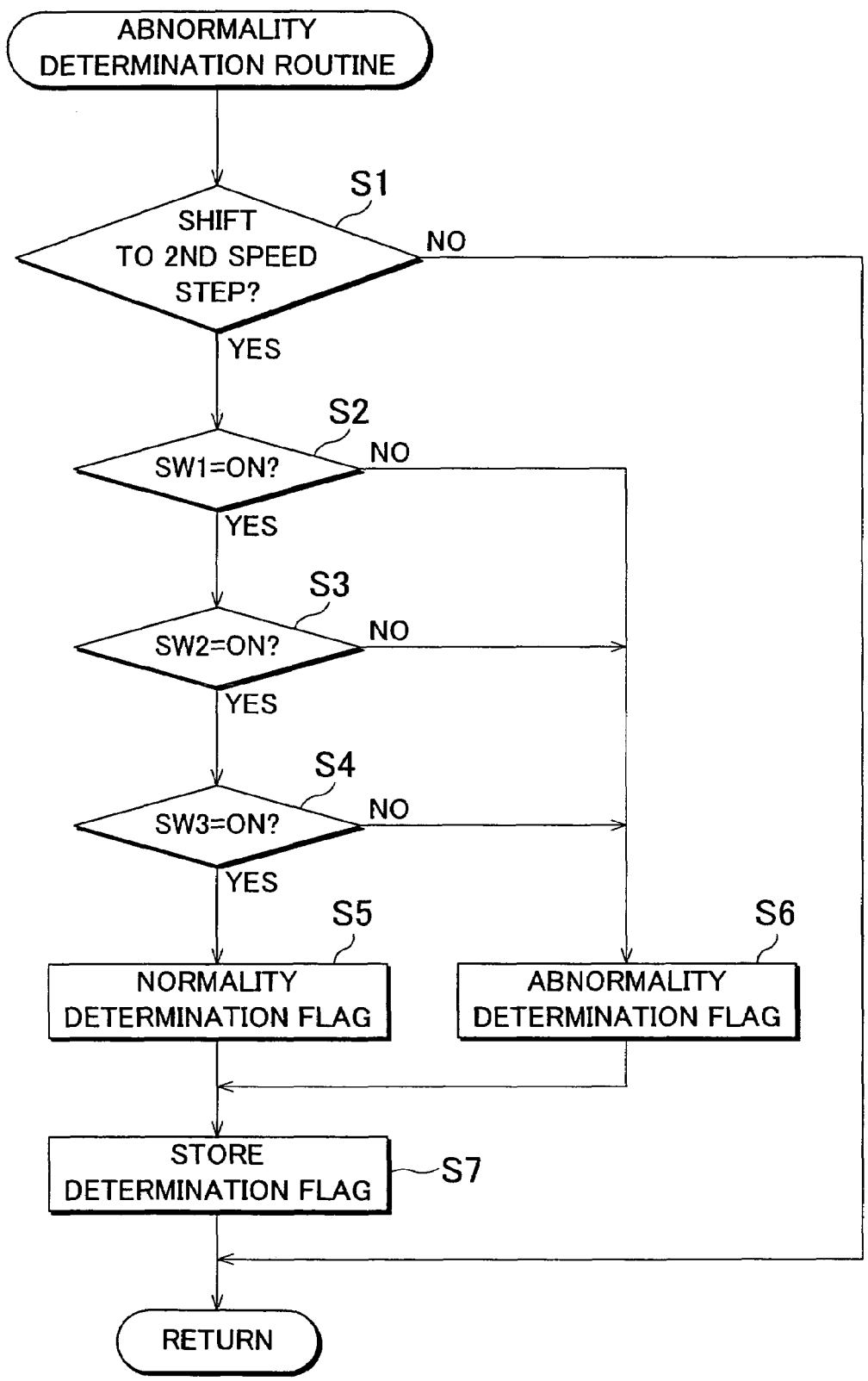
FIG. 10 is a flowchart illustrating portions of the control operation of the electronic control devices shown in FIG. 1, that is, an abnormality determination routine for performing abnormality determination regarding a high speed step, and is a subroutine corresponding to an abnormality determination routine that is executed in a flowchart shown in FIG. 11.

FIG. 10 is a flowchart illustrating portions of the control functions of the electronic control devices 28, 34 and 44, that is, an abnormality determination routine for performing the abnormality determination regarding the high speed step H. This routine is repeatedly executed in a very short cycle time of, for example, about several msec to several ten msec.

Firstly, in step (hereinafter, "step" will be omitted) S1 corresponding to the speed change step determination device 140, it is determined whether or not the shift of the transmission 22 to the high speed step H (second gear step) has been performed, for example, on the basis of whether or not the command values of the drive currents ISOL1 and ISOL2 for obtaining the high speed step H have been output to the hydraulic control circuit 50.

If a negative judgment is made in S1, this routine is ended. If an affirmative judgment is made in S1, it is then determined whether or not the switch SW1 is in the on-state, in S2 corresponding to the abnormality determination device 136. If an affirmative judgment is made in S2, it is then determined whether or not the switch SW2 is in the off-state, in S3 corresponding to the abnormality determination device 136. If an affirmative judgment is made in S3, it is then determined whether or not the switch SW3 is in the on-state, in S4 corresponding to the abnormality determination device 136.

If an affirmative judgment is made in S4, the high-speed step normality determination flag FHG is set up as the high-speed step determination flag FH in S5 corresponding to the abnormality determination device 136. On the other hand, if a negative judgment is made in any one of S2 to S4, the high-speed step abnormality determination flag FHE is set up as the high-speed step determination flag FH in S6 corresponding to the abnormality determination device 136.

Subsequently to S5 or S6, in S7 corresponding to the storage device 138, the high-speed step determination flag FH is stored while it is being rewritten to the determination flag F set up in S5 or S6.

Furthermore, subsequently to S5 or S6, in a step (not shown) corresponding to the fail-safe process device 142, the command to prohibit the shift to the high speed step H is output if the high-speed step abnormality determination flag FHE has been set up as the high-speed step determination flag FH. Then, if it is determined that there is an abnormality regarding the high speed step H, the vehicle is run only on the low speed step L from then on. On the other hand, if the high-speed step normality determination flag FHG has been set up as the high-speed step determination flag FH, the command to prohibit the shift to the high speed step H is not output. Then, if it is determined that the high speed step H is normal, the switch between the low speed step L and the high speed step H is performed, for example, from a shift chart shown in FIG. 9 on the basis of the state of the vehicle, from then on.

FIG. 11 is a flowchart illustrating portions of the control functions of the electronic control devices 28, 34 and 44, that is, a control operation for performing the abnormality determination regarding the high speed step H which is a system check that is executed at the time of start of vehicle run. This routine is repeatedly executed in a very short cycle time of, for example, about several msec to several ten msec. The abnormality determination routine of FIG. 10 is a subroutine that corresponds to the abnormality determination routine executed in the flowchart of FIG. 11.

Firstly in step S11 corresponding to the vehicle run start determination device 146, it is determined whether or not a user's operation for starting to run the vehicle has been performed, for example, on the basis of whether or not the power switch ST_ON has been operated in a state where the brake pedal is operated after the key has been inserted into the key slot.

If a negative judgment is made in S11, this routine is ended. However, if an affirmative judgment is made in S11, the process proceeds to S12 corresponding to the previous-trip abnormality determination device 148. In S12, it is determined whether or not an abnormality regarding the high speed step H occurred during the previous trip, for example, on the basis of whether or not the high-speed step abnormality determination flag FHE is stored as the high-speed step determination flag FH in S7 in FIG. 10.

If an affirmative judgment is made in S12, the process proceeds to S13 corresponding to the re-determination-purpose speed change step establishment device 144. In S13, the high speed step H is established in order that the presence/absence of an abnormality of an element related to the formation of the high speed step H will be re-determined in the abnormality determination routine of FIG. 13.

Subsequently, in S14 corresponding to the abnormality determination routine shown in FIG. 10, the abnormality of the element related to the formation of the high speed step H is determined to be present, and the high-speed step determination flag FH is newly set up and thus updated.

Subsequently, in S15 corresponding to the fail-safe process device 142, the abnormality determination is performed on the basis of the high-speed step determination flag FH updated in S14.

If the high-speed step abnormality determination flag FHE is set up as the high-speed step determination flag FH in S14 and an affirmative judgment is made in S14, the command to prohibit the shift to the high speed step H is output as a fail-safe process in S16 corresponding to the fail-safe process device 142. Thus, the shift to the high speed step H is prohibited beforehand, without the need to actually perform the shift to the high speed step H during the running of the vehicle.

If the high-speed step normality determination flag FHG has been set up as the high-speed step determination flag FH in S14 and a negative judgment is made in S15, the command to prohibit the shift to the high speed step H is not output, as a normal-time process, in S17 corresponding to the fail-safe process device 142. Therefore, the shift to the high speed step H is allowed during the running of the vehicle.

In the case where a negative judgment is made in S12, or subsequently to S16 or S17, an operation for putting the vehicle into the ready-to-run state by setting up the low speed step L (1st speed gear step) in S18 corresponding to the shift control device 132.

As described above, according to the embodiment, if the information about an abnormality of an element related to the formation of the high speed step H which was determined to be present by the abnormality determination device 136 is stored in the storage device 138 when the vehicle is to newly start to run, the high speed step H is established by the re-determination-purpose speed change step establishment device 144 in order to cause the re-determination of the presence/absence of the abnormality of the element related to the formation of the high speed step H. Therefore, the occurrence of the abnormality that cannot be detected unless the high speed step H has actually been established can be determined before the vehicle runs on the high speed step H. Therefore, for example, if the abnormality exists, the fail-safe operation of prohibiting the shift to the high speed step H can be performed. On the other hand, if normality has returned, the shift to the high speed step H is allowed. Thus, the drivability can be improved.

Furthermore, the frequency of the abnormality determination being performed regarding the high speed step H, which is less frequently used, becomes higher, so that the drivability can be further improved.

Furthermore, in response to the activating operation of the vehicle and prior to the setting of the ready-to-run state, the transmission 22 is caused to be in the high speed step H by the re-determination-purpose speed change step establishment device 144. Therefore, there is a need to set up the high speed step H and perform the abnormality determination again beforehand only in the case where the information about the abnormality is stored. That is, it is no longer necessary to set up the high speed step H and perform the abnormality determination every time the vehicle is to newly start to run. Therefore, the low speed step L can be promptly set up, and the time required before the vehicle is put into the ready-to-run state is shortened, and the drivability can be improved.

While the embodiment of the invention has been described in detail with reference to the drawings, the invention is also applicable in other manners.

For example, although in the foregoing embodiment, the transmission 22 is a two-step automatic transmission (speed reducer) having the low speed step L and the high speed step H which is provided between the MG2 and the output shaft 14 so that the torque the MG2 outputs is increased and then applied to the output shaft 14, the transmission 22 is not restrictive, that is, the invention is also applicable if a different type of transmission is employed. For example, the invention is also applicable if a well-known planetary gear type stepped (multi-step) transmission that transmits the output of the engine 24 to the driving wheels 18 is employed.

Furthermore, although in the foregoing embodiment, the abnormality determination device 136 performs the abnormality determination regarding the speed change steps L, H in accordance with the on/off-states of the switches SW1, SW2, SW3, this determination method is not restrictive, but other determination methods may also be used. For example, the abnormality determination regarding the speed change steps L, H may be performed by performing the abnormality determination regarding a break or shortcircuit of each of the first linear solenoid valve SLB1 and the second linear solenoid valve SLB2 on the basis of detection signals supplied from well-known IC type abnormality detection sensors such as a break detection sensor, a shortcircuit detection sensor, etc.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An abnormality determination device of a vehicle that includes a stepped type automatic transmission capable of forming a plurality of speed change steps, comprising:
   an abnormality determiner that determines presence/absence of an abnormality of an element related to formation of a predetermined speed change step in a state of the vehicle where the predetermined speed change step is formed;
   a storage device that stores information about the abnormality determined to be present by the abnormality determiner; and
   a controller that establishes, if the information about the abnormality is stored in the storage device when the vehicle is to newly start to run, the predetermined speed change step where the abnormality stored occurred, in order to cause re-determination of the presence/absence of the abnormality of the element related to the formation of the predetermined speed change step.

2. The abnormality determination device of the vehicle according to claim 1,
   wherein the stepped type automatic transmission is capable of forming one or more speed change steps on a low speed step side, and one or more speed change steps on a high speed step side, and
   wherein if the information about the abnormality stored in the storage device is information about an element related to the formation of a speed change step on the high speed step side, the controller forms the speed change step on the high speed step side and causes the abnormality determiner to re-determine the presence/absence of the abnormality of the element related to the formation of the speed change step on the high speed step side when the vehicle is to newly start to run.

3. The abnormality determination device of the vehicle according to claim 2,
   wherein the vehicle is a hybrid vehicle, and
   wherein the controller causes the stepped type automatic transmission to be in the speed change step on the high speed step side in response to an activating operation of the hybrid vehicle and prior to setting of a ready-to-run state of the vehicle.

4. The abnormality determination device of the vehicle according to claim 2,
   wherein the speed change steps on the low speed step side consist of only one low speed step, and the speed change steps on the high speed step side consist of only one high speed step, and
   wherein if the information about the abnormality stored in the storage device is information about the element related to the formation of the high speed step, the controller forms the high speed step and causes the abnormality determiner to re-determine the presence/absence of the abnormality of the element related to the formation of the high speed step when the vehicle is to newly start to run.

5. The abnormality determination device of the vehicle according to claim 4,
   wherein the vehicle is a hybrid vehicle, and
   wherein the controller causes the stepped type automatic transmission to be in the high speed step in response to the activating operation of the hybrid vehicle and prior to the setting of the ready-to-run state of the vehicle.

6. An abnormality determination method of a vehicle that includes a stepped type automatic transmission capable of forming a plurality of speed change steps, comprising:
   determining presence/absence of an abnormality of an element related to formation of a predetermined speed change step in a state of the vehicle where the predetermined speed change step is formed;
   storing information about the abnormality determined to be present; and
   establishing, if the information about the abnormality is stored when the vehicle is to newly start to run, the predetermined speed change step where the abnormality stored occurred, and re-determining the presence/absence of the abnormality of the element related to the formation of the predetermined speed change step.

7. The abnormality determination method of the vehicle according to claim 6,
   wherein the stepped type automatic transmission is capable of forming one or more speed change steps on a low speed step side, and one or more speed change steps on a high speed step side, and
   wherein if the stored information about the abnormality is information about an element related to the formation of a speed change step on the high speed step side, the speed change step on the high speed step side is formed and the presence/absence of the abnormality of the element related to the formation of the speed change step on the high speed step side is re-determined when the vehicle is to newly start to run.

8. The abnormality determination method of the vehicle according to claim 7,
   wherein the vehicle is a hybrid vehicle, and
   wherein the stepped type automatic transmission is caused to be in the speed change step on the high speed step side in response to an activating operation of the hybrid vehicle and prior to setting of a ready-to-run state of the vehicle.

9. The abnormality determination method of the vehicle according to claim 7,
   wherein the speed change steps on the low speed step side consist of only one low speed step, and the speed change steps on the high speed step side consist of only one high speed step, and
   wherein if the stored information about the abnormality is information about the element related to the formation of the high speed step, the high speed step is formed and the presence/absence of the abnormality of the element related to the formation of the high speed step is re-determined when the vehicle is to newly start to run.

10. The abnormality determination method of the vehicle according to claim 9,
    wherein the vehicle is a hybrid vehicle, and
    wherein the stepped type automatic transmission is caused to be in the high speed step in response to the activating operation of the hybrid vehicle and prior to the setting of the ready-to-run state of the vehicle.

* * * * *

UNITED STATES PATENT AND TRADEMARK OFFICE
CERTIFICATE OF CORRECTION

PATENT NO.         : 7,426,854 B2                                          Page 1 of 1
APPLICATION NO. : 11/653401
DATED              : September 23, 2008
INVENTOR(S)       : Hiroatsu Endo and Kazuo Kawaguchi It is certified that error appears in the above-identified patent and that said Letters Patent is hereby corrected as shown below:

Title page:

Item (73), please change "Toyota Jidhosa Kabushiki Kaisha" to "Toyota Jidosha Kabushiki Kaisha".

Signed and Sealed this

Thirtieth Day of December, 2008

JON W. DUDAS
*Director of the United States Patent and Trademark Office*